(12) United States Patent
Woo et al.

(10) Patent No.: US 12,540,037 B2
(45) Date of Patent: Feb. 3, 2026

(54) DEVICE FOR MAINTAINING TENSION OF MEDIA TRANSPORT BELT, AUTOMATIC TELLER MACHINE, AND TENSION MAINTAINING APPARATUS THEREOF

(71) Applicant: HYOSUNG TNS INC., Seoul (KR)

(72) Inventors: Hyun Sik Woo, Seoul (KR); Dongkyung Kim, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 273 days.

(21) Appl. No.: 18/490,200

(22) Filed: Oct. 19, 2023

(65) Prior Publication Data
US 2024/0140721 A1    May 2, 2024

(30) Foreign Application Priority Data

Oct. 28, 2022 (KR) .......................... 10-2022-0141408
Dec. 29, 2022 (KR) .......................... 10-2022-0189853

(51) Int. Cl.
| | | |
|---|---|---|
| B65G 23/44 | (2006.01) | |
| B65H 5/02 | (2006.01) | |
| G07D 11/16 | (2019.01) | |
| G07F 19/00 | (2006.01) | |

(52) U.S. Cl.
CPC .............. *B65G 23/44* (2013.01); *B65H 5/025* (2013.01); *G07D 11/16* (2019.01); *G07F 19/203* (2013.01); *B65H 2404/255* (2013.01); *B65H 2701/1912* (2013.01)

(58) Field of Classification Search
None
See application file for complete search history.

(56) References Cited

U.S. PATENT DOCUMENTS

| | | | | |
|---|---|---|---|---|
| 6,971,509 B2 * | 12/2005 | Ertel | ................... | B65G 23/44 |
| | | | | 198/813 |
| 2013/0264176 A1 * | 10/2013 | Knas | ................... | B65G 23/44 |
| | | | | 198/835 |

FOREIGN PATENT DOCUMENTS

| | | | | | |
|---|---|---|---|---|---|
| JP | 2006219234 A | * | 8/2006 | | |
| JP | 2010285227 A | * | 12/2010 | | |
| KR | 20-0388998 | | 6/2005 | | |
| KR | 200388998 Y1 | * | 7/2005 | ......... | G07D 11/0021 |
| KR | 101177945 B1 | * | 8/2012 | | |
| KR | 101181435 B1 | * | 9/2012 | ........... | G07F 19/201 |
| KR | 101545480 B1 | * | 8/2015 | ............. | G07D 11/16 |

* cited by examiner

*Primary Examiner* — Gene O Crawford
*Assistant Examiner* — Muhammad Awais
(74) *Attorney, Agent, or Firm* — BACON & THOMAS, PLLC

(57) ABSTRACT

According to an embodiment of a tension maintaining device of a media transport belt, a device for maintaining tension of a belt to ensure a gripping force of the belt for gripping and transporting bundled media, in which a plurality of pieces of media are stacked, includes a rotation shaft; a link member coupled to the rotation shaft while having a predetermined length in a direction parallel to the longitudinal direction of the belt, and provided to be rotatable about the rotation shaft in response to a change in the number of pieces of the bundled media in contact with the belt; a first roller rotatably coupled to a first roller shaft provided at one end of the link member and maintained in contact with the belt; and a second roller rotatably coupled to a second roller shaft provided at the other end of the link member and maintained in contact with the belt.

15 Claims, 8 Drawing Sheets

[FIG.1]
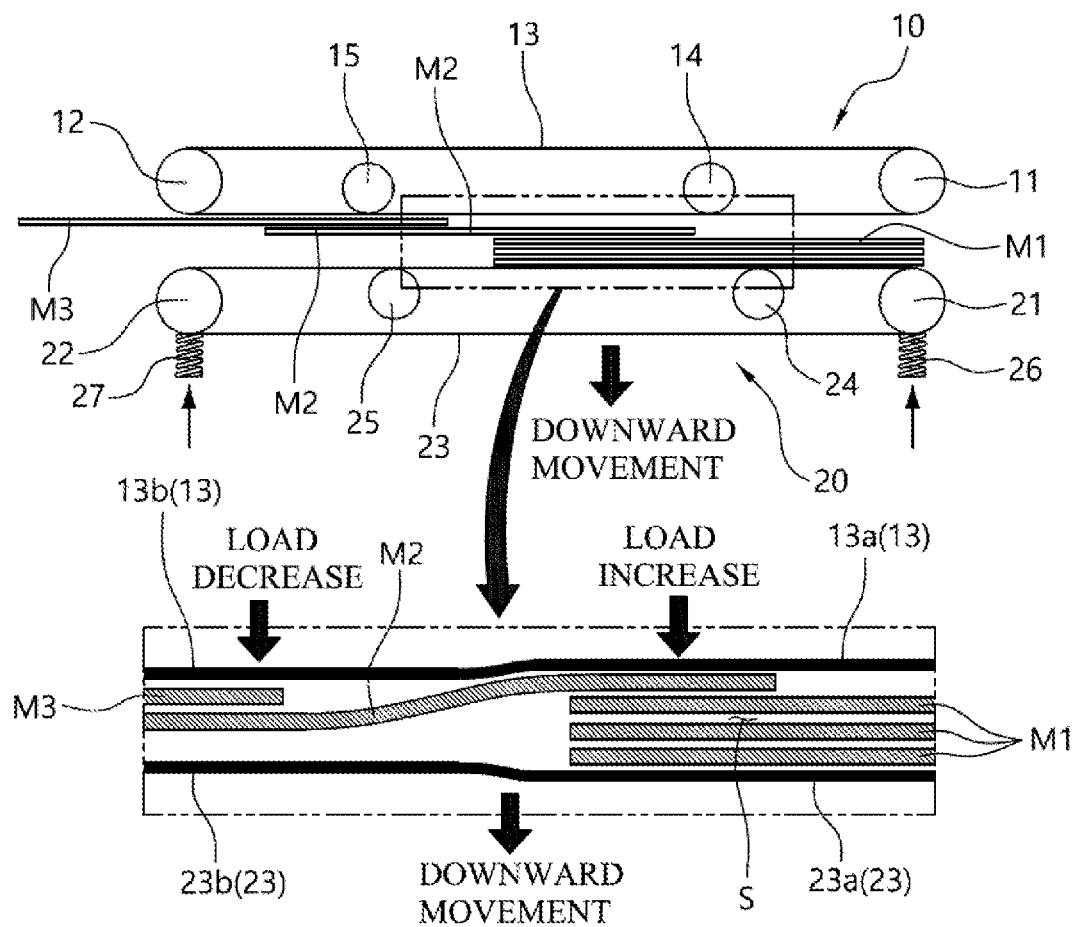

[FIG.2]
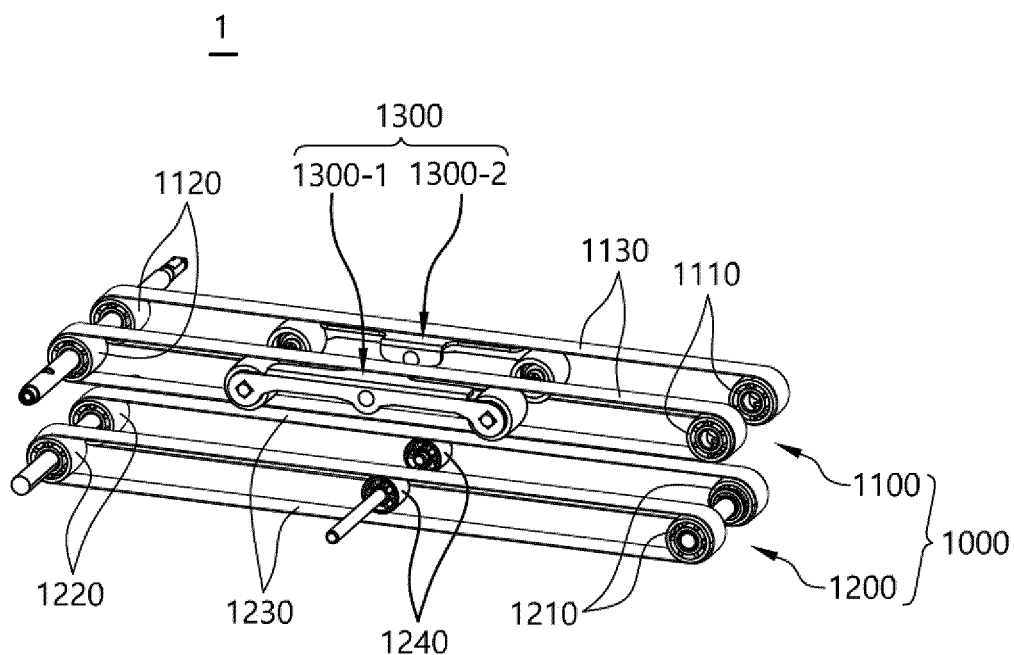
[FIG.3]
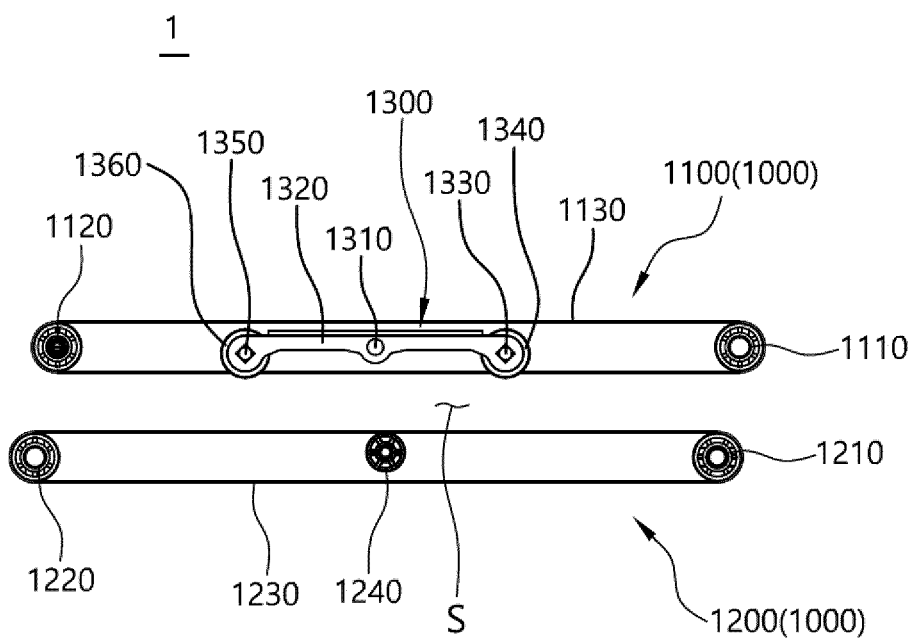

[FIG.4]
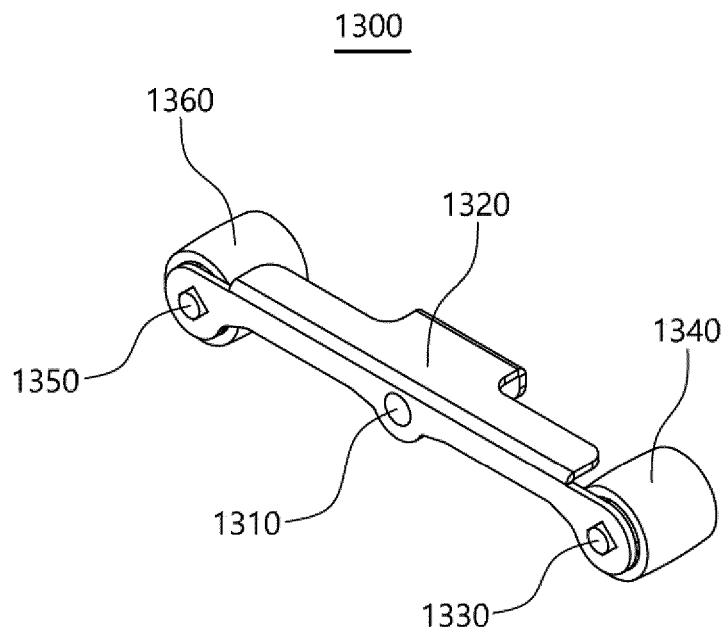
[FIG.5A]
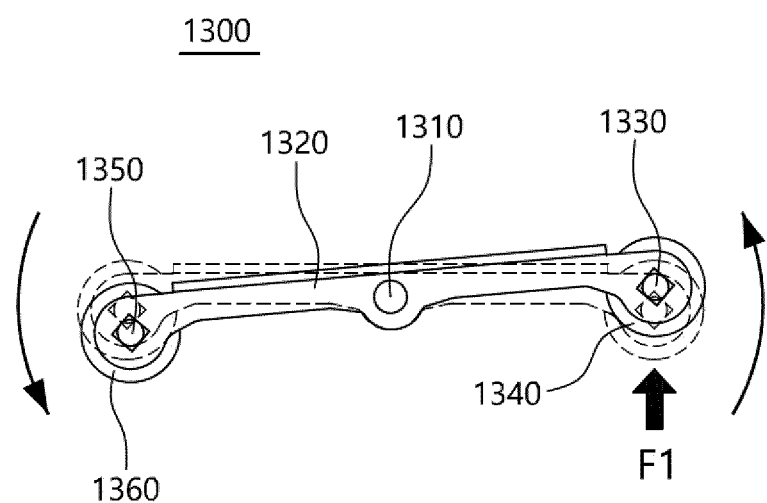

[FIG.5B]
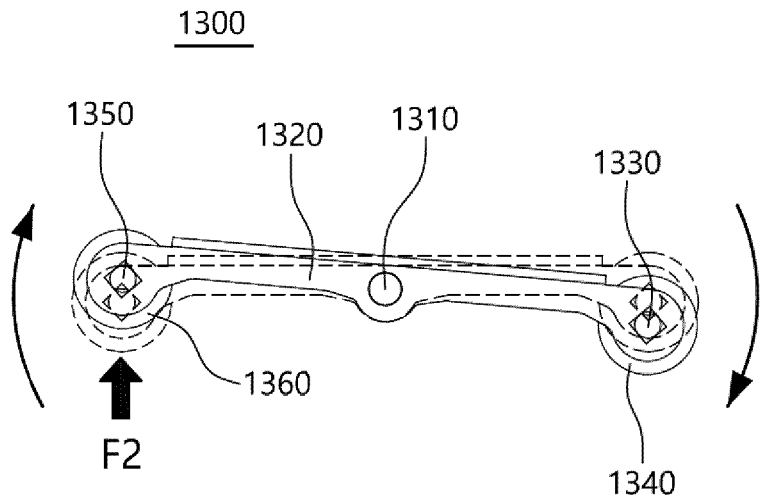
[FIG.6]
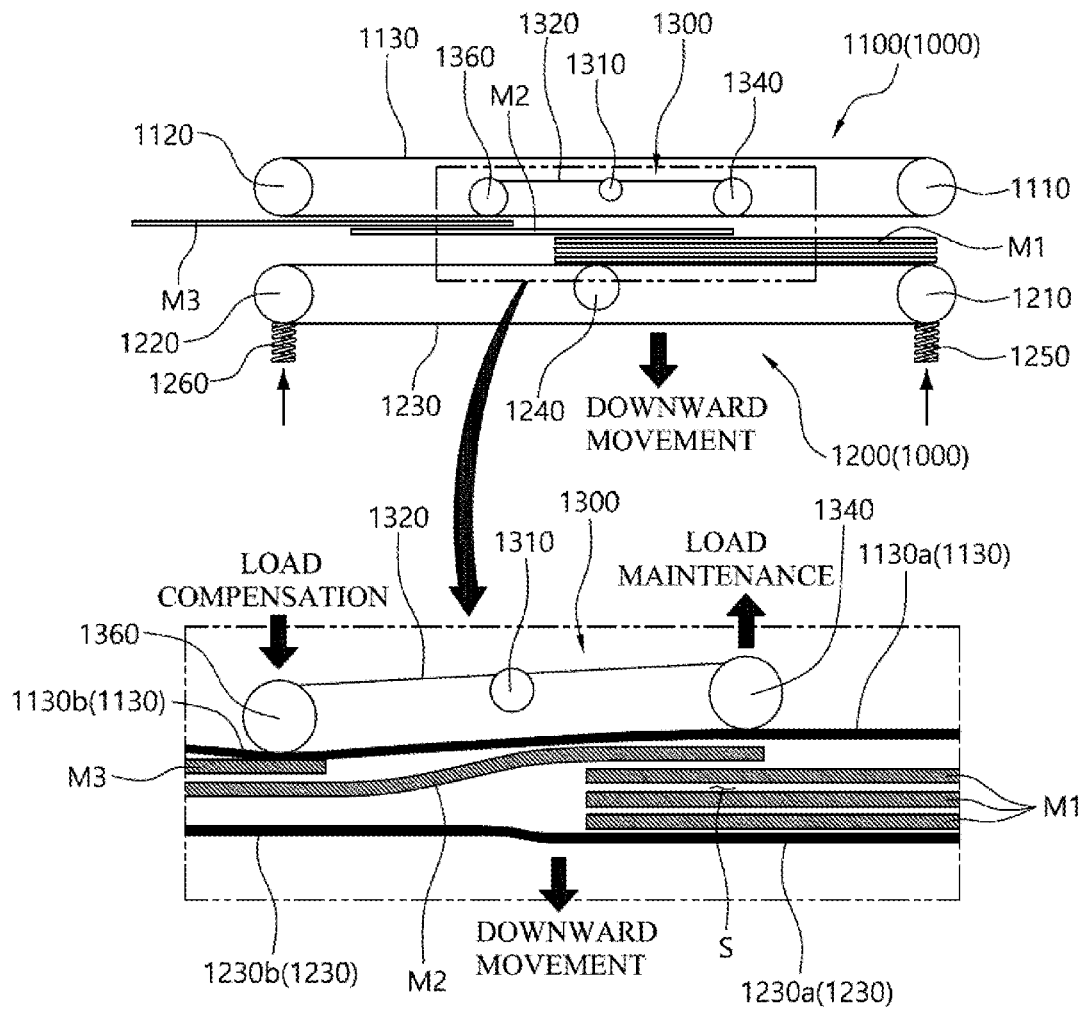

[FIG.7]
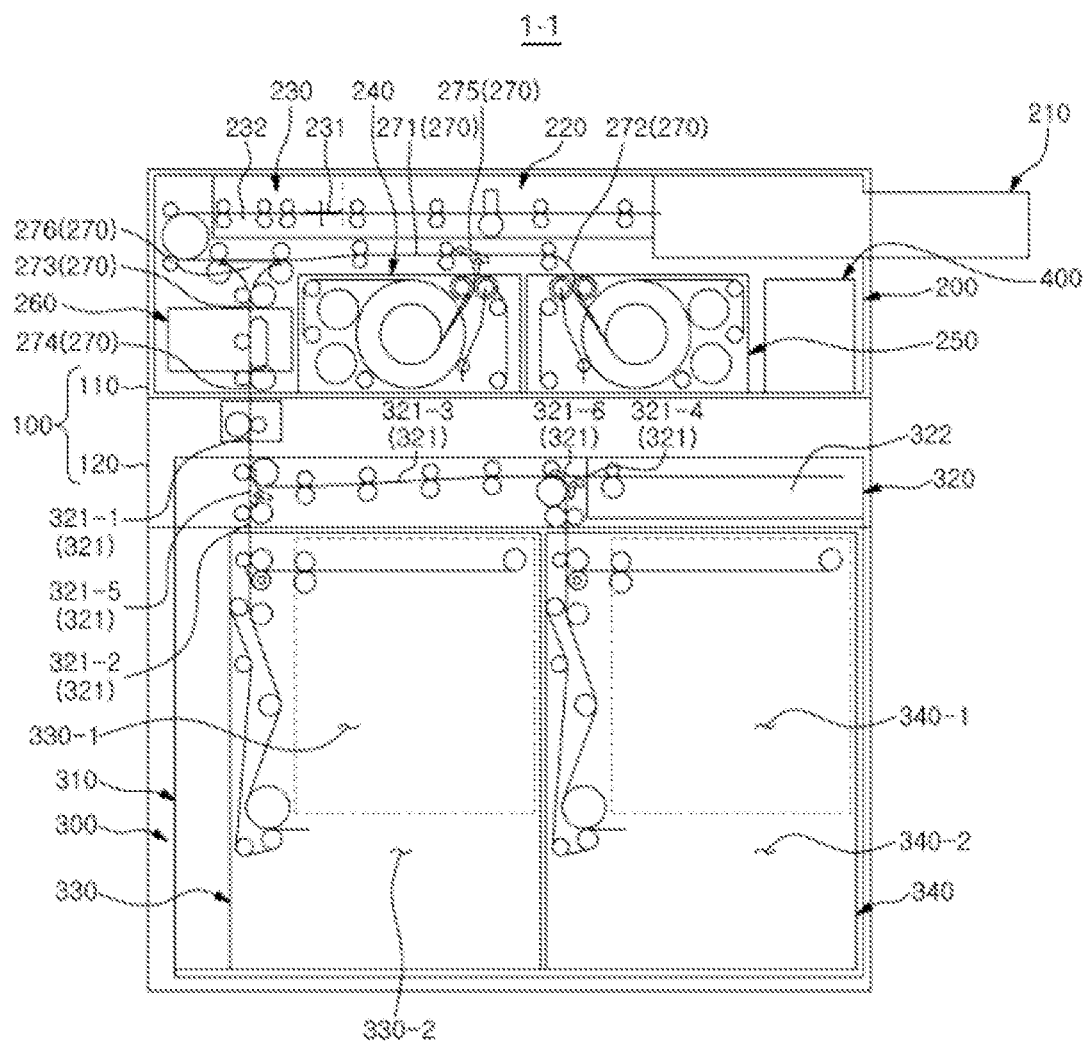

[FIG.8]
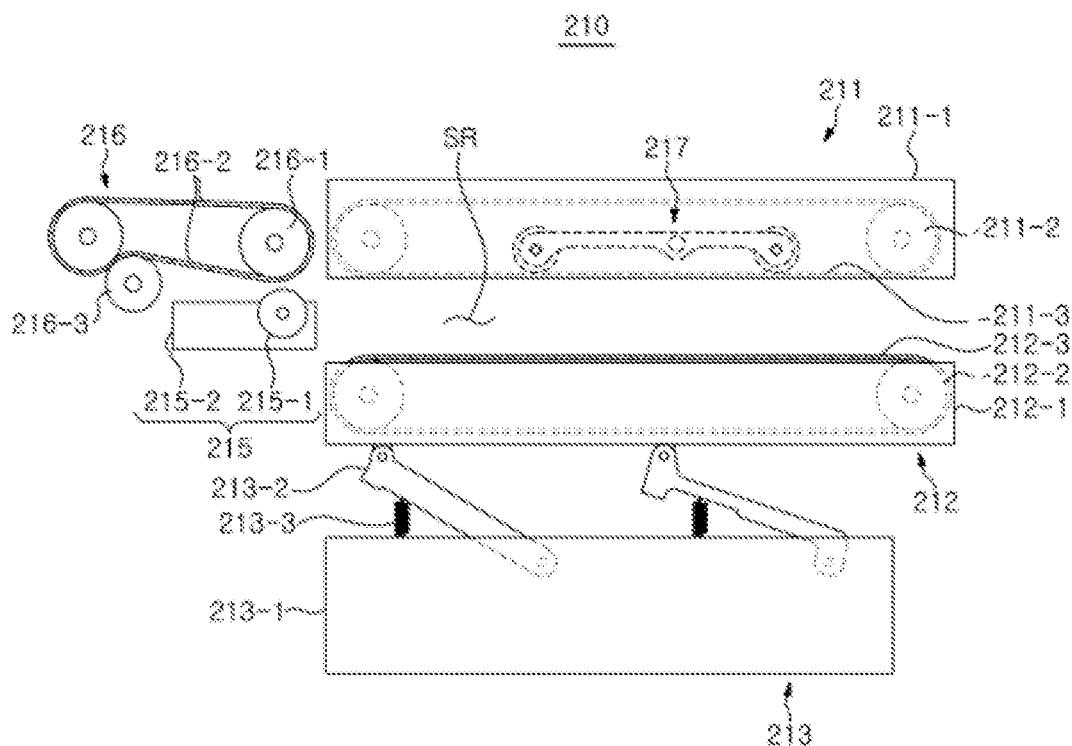
[FIG.9]
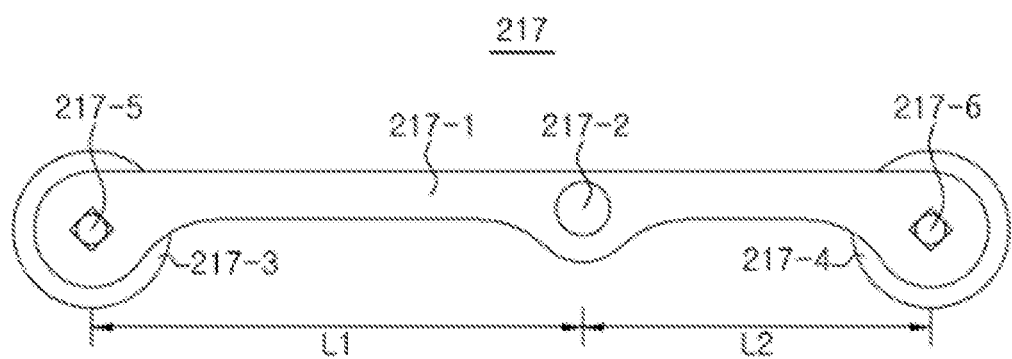

[FIG.10]
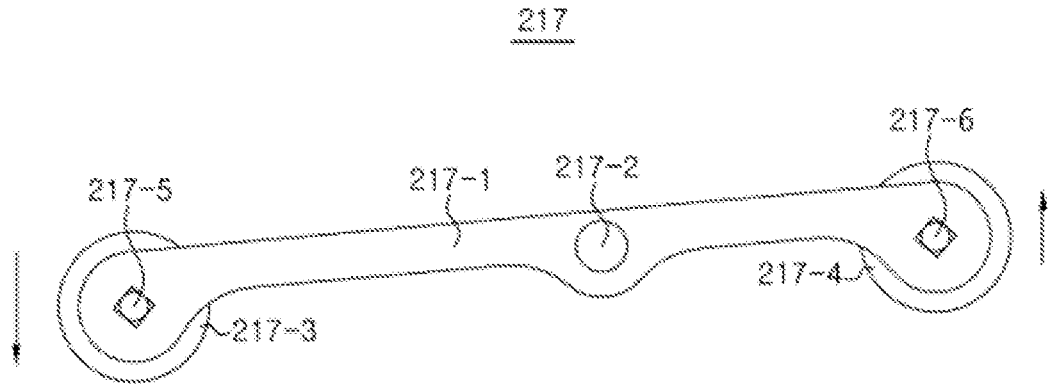
[FIG.11]
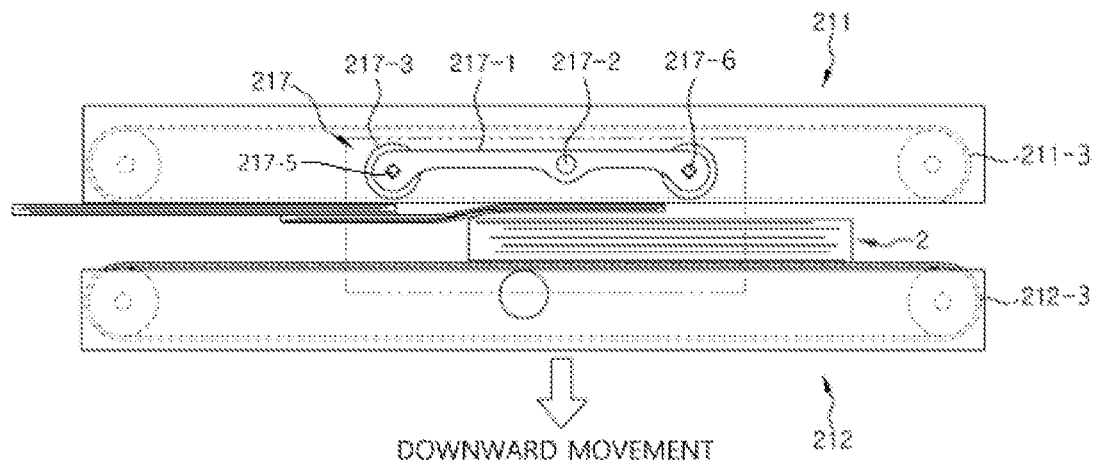
DOWNWARD MOVEMENT
[FIG.12]
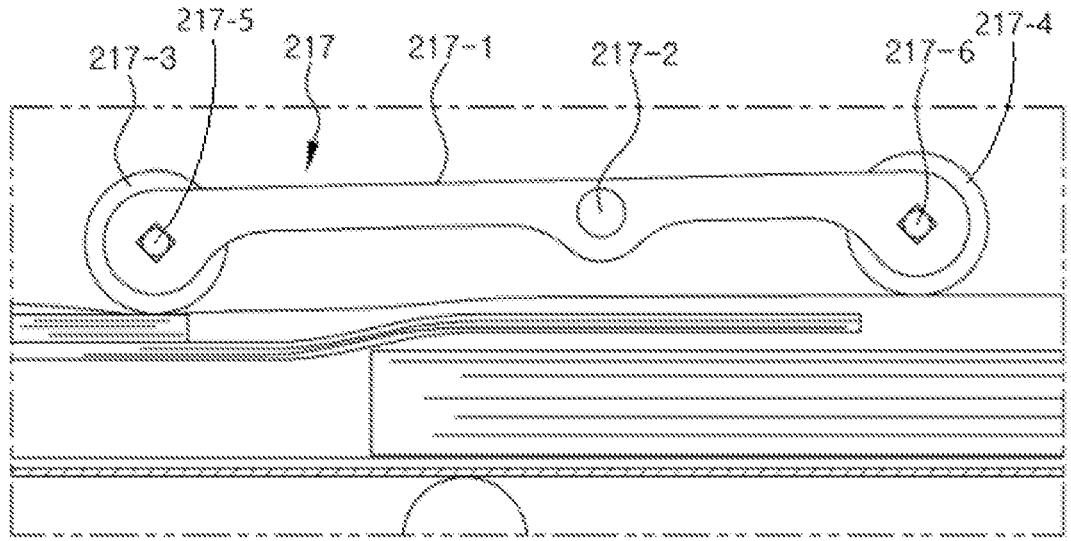

[FIG.13]
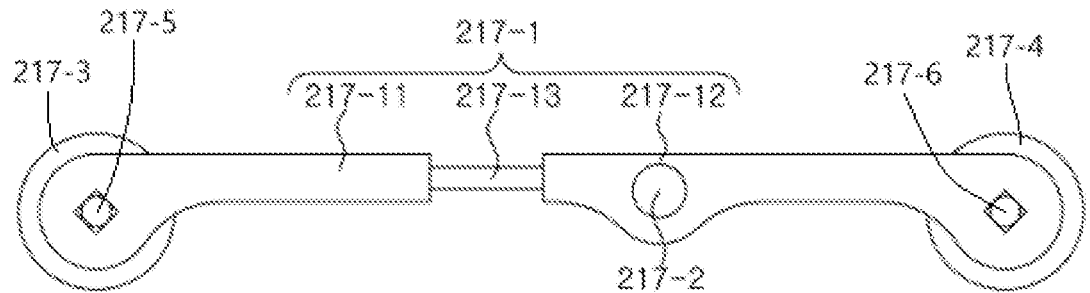
[FIG.14]
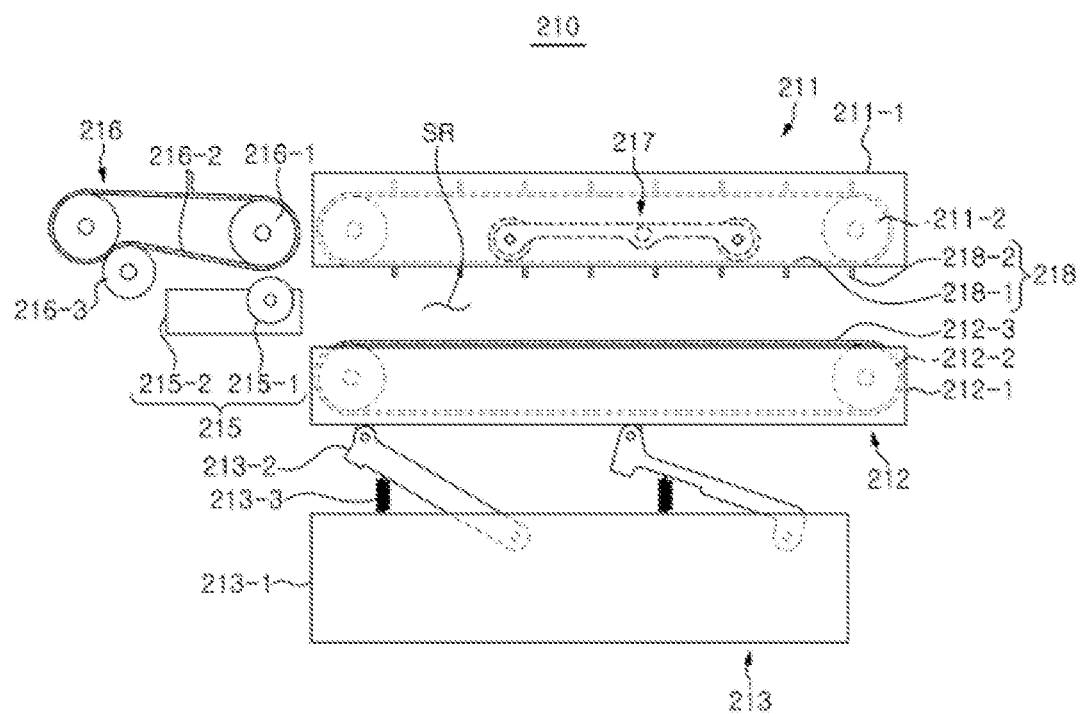

DEVICE FOR MAINTAINING TENSION OF MEDIA TRANSPORT BELT, AUTOMATIC TELLER MACHINE, AND TENSION MAINTAINING APPARATUS THEREOF

BACKGROUND

1. Field of the Invention

The present invention relates to a device for maintaining the tension of a media transport belt, an automatic teller machine, and an apparatus for maintaining the tension of the automatic teller machine, and more particularly, to a device for maintaining the tension of a media transport belt that maintains the tension of the belt uniformly in response to a change in the number of pieces of the media stacked and transported between the belts, an automatic teller machine, and an apparatus for maintaining the tension of the automatic teller machine.

2. Discussion of Related Art

The conventional automatic teller machine is a device that has been developed to provide most financial services, except for consulting services, quickly and conveniently in an unmanned manner regardless of time, and may include a cash dispenser unit (CDU), a bill recycling machine (BRM), a cash and check in module (CCIM) that can simultaneously deposit and reject multiple pieces of media such as cash and checks in bundled units, and the like.

The conventional automatic teller machine includes a bundle module for accepting media in bundled units and transporting the media through a transport belt, a separation unit for separating the media inserted into the bundle module into individual pieces, a discrimination unit for discriminating information and authenticity of the deposited media being transported after passing through the separation unit, a print module for imprinting information required for deposited checks, a cassette unit for storing the media discriminated as valid by the discrimination unit among the deposited media, and a reject module for returning and storing the media discriminated to be rejected as invalid by the discrimination unit or the media canceled for deposit and reception among the deposited media and then transporting the rejected media to the bundle module in bundled units.

However, in the case of the conventional automated teller machine, when media are collectively transported in bundled units by the bundle module, the media may become disorganized and cause jams on a transport path, or the leading edge of the media may not be aligned due to the different sizes of various media, which may cause the media to remain in the transport path and be discharged to a customer multiple times. Here, as the number of pieces of stacked media increases, these problems may increase.

In particular, when the media are stacked on one side and the other side of the transport belt of the bundle module, the load acting on the one side and other side of the transport belt may be different, leading to an uneven gripping force for the media on one side and the other side of the transport belt or uneven tension on the one side and the other side of the transport belt.

When rejecting and transporting the media in a conventional CCIM, in order for the vertically provided transport belt to reject and transport the bundled media, a certain gripping force is required be secured between the medium and the belt in contact with the media. In the case of media that are first transported into a media stack space between the transport belts and stacked, both the top and bottom surfaces of the media are in contact with the belt, thereby securing the gripping force. However, in the case of media that are transported and stacked after the first transported and stacked media, the top surface of the media is in contact with the belt, but the bottom surface thereof is in contact with the top surface of the first stacked media and not in contact with the belt, and therefore does not secure the gripping force.

Conventionally, in order to smoothly transport media after the secondly stacked media, as disclosed in Korean Patent Publication No. 10-2022-0012723, using a belt including a plurality of transport sheets attached to the outer circumference thereof at a regular interval, the transport sheets are moved while in contact with the top surface of the media to exert frictional force, allowing the media to be transported to a predetermined stack position. However, in this related art, there is a problem in that the structure of a device for transporting bundled media becomes complicated because the belt including the transport sheets attached thereto and a driving unit for driving the belt must be separately provided.

Referring to FIG. 1, the conventional transport path for transporting bundled media by stacking multiple pieces of media includes a first media transport unit 10 provided above the bundled media, and a second media transport unit 20 provided below the bundled media.

The first media transport unit 10 includes a pair of pulleys 11 and 12 provided at positions spaced apart from each other on both sides thereof, a first transport belt 13 that grips the top surface of the bundled media while running on the pair of first pulleys 11 and 12, and a plurality of first tension rollers 14 and 15 that apply tension to the first transport belt 13 toward the bundled media.

The second media transport unit 20 includes a pair of second pulleys 21 and 22 provided at positions spaced apart from each other on both sides thereof, a second transport belt 23 that grips the top surface of the bundled media while running on the pair of second pulleys 21 and 22, and a plurality of second tension rollers 24 and 25 that apply tension to the second transport belt 23 toward the bundled media. In addition, the second media transport unit 20 may further includes pressing members 26 and 27 that are provided on both lower sides of the second media transport unit 20 to apply elastic force in an upward direction.

When media are sequentially transported and stacked in a media stacked space S between the first transport belt 13 and the second transport belt 23, media M2 and M3 are sequentially stacked on a plurality of pieces of first stacked media M1. The second media transport unit 20 moves downward in proportion to an increase in the number of pieces of the stacked media to secure an additional stack space.

At this time, a load acting on the one sides 13a and 23a of the first and second transport belts where the number of pieces of the stacked media is relatively large may be relatively increased, and a load acting on the other sides 13b and 23b of the first and second transport belts where the number of pieces of the stacked media is relatively small may be relatively reduced. As a result, a transport contact surface may become uneven depending on the shape of the media, a change in the amount of contact points for each size of the media may occur, and a transport force may decrease due to uneven changes in the first and second transport belts 13 and 23, making it difficult to transport the medium to a predetermined position.

In addition, in the conventional media transport path, a plurality of tension rollers 24 and 25 are installed to apply tension to the belt in a direction of contact with the medium in order to secure the gripping force on the media, but there is a problem in that it is not easy to adjust the tension so that uniform tension is applied between the plurality of tension rollers 24 and 25, and the number of parts increases.

Prior art related to a device for adjusting belt tension is disclosed in Korean Patent Publication No. 10-1952964.

SUMMARY OF THE INVENTION

The present invention is directed to providing a device for maintaining the tension of a media transport belt that simplifies the configuration of a device for adjusting the tension of a transport belt provided in a transport path through which media are transported.

The present invention is also directed to providing an automatic teller machine that can uniformly maintain the tension of a transport belt in response to a change in the number of pieces of media stacked on the transport belt, and an apparatus for maintaining the tension of the automatic teller machine.

According to an aspect of the present invention, there is provided a device for maintaining tension of a belt to ensure a gripping force of the belt for gripping and transporting bundled media in which a plurality of pieces of media are stacked, the device comprising: a rotation shaft; a link member coupled to the rotation shaft while having a predetermined length in a direction parallel to the longitudinal direction of the belt, and provided to be rotatable about the rotation shaft in response to a change in the number of pieces of the bundled media in contact with the belt; a first roller rotatably coupled to a first roller shaft provided at one end of the link member and maintained in contact with the belt; and a second roller rotatably coupled to a second roller shaft provided at the other end of the link member and maintained in contact with the belt.

The rotation shaft is provided in a fixed position, and the first roller and the second roller are provided to be maintained in contact with the belt while applying predetermined tension to a side surface opposite one side surface of the belt in which the bundled media are gripped.

When the number of pieces of media stacked on a side where the first roller is positioned differs from the number of pieces of media stacked on a side where the second roller is positioned, the link member is tilted to one side due to a seesaw action while the first roller and the second roller are moved in a direction of a force acting by deformation of the belt due to a thickness of the stacked media.

The belt includes a first transport belt provided at an upper portion of the bundled media to be in contact with an upper surface of the bundled media, and a second transport belt provided at a lower portion of the bundled media to be in contact with a lower surface of the bundled media, the first roller and the second roller are provided to be maintained in contact with the first transport belt, and the second transport belt is moved vertically in response to an increase or decrease in the number of pieces of the stacked media.

When the number of pieces of media stacked under the first roller and the number of pieces of media stacked under the second roller are different, one of the first roller and the second roller positioned on a side on which the number of pieces of the stacked media is relatively larger is moved in a direction in which the first transport belt rises to prevent tension overload, and the other of the first roller and the second roller positioned on a side on which the number of pieces of the stacked media is relatively smaller is moved in a direction in which the first transport belt is lowered to compensate for tension lost due to downward movement of the second transport belt.

Even when the number of pieces of media stacked under the first roller and the number of pieces of media stacked under the second roller are the same, the first roller and the second roller are provided in contact with the first transport belt while applying predetermined tension to the first transport belt.

A tension maintaining device of the media transport belt is provided on a transport belt where rejected media are stacked in a media deposit machine.

According to an aspect of the present invention, there is provided a tension maintaining device of an automatic teller machine, which is arranged to support a transport belt of a bundle reception unit, into which bundled media are input, and provides uniform tension on the media on the transport belt, the tension maintaining device comprising: a link member; a ling rotation shaft rotatably connected to the bundle reception unit at an eccentric position with respect to the longitudinal direction of the link member; a first link roller disposed on one end of the link member to support one side surface of the transport belt; and a second link roller disposed on the other end of the link member to support the other side surface of the transport belt, wherein, when the media are transported by the transport belt, the first link roller and the second link roller are lifted and lowered in different vertical directions to provide uniform tension to the transport belt.

A first separation distance between the first link roller and the link rotation shaft is greater than a second separation distance between the second link roller and the link rotation shaft.

The link member is disposed at a center in the longitudinal direction of the transport belt, and the link rotation shaft is disposed between a center of gravity of the link member and an end of the link member.

The link rotation shaft is movable between the center of gravity of the link member and the end of the link member.

When a difference value between a stack amount of the media positioned at a side of the first link roller and a stack amount of the media positioned at a side of the second link roller is greater than a predetermined reference value, the link rotation shaft is positioned at a point closer to the end of the link member.

According to an aspect of the present invention, there is provided an automatic teller machine comprising: a bundle reception unit configured to receive bundled media; a discrimination unit configured to discriminate the media received in the bundle reception unit; and a control unit configured to control the bundle reception unit and the discrimination unit, wherein the bundle reception unit includes: the tension maintaining device; a first bundle conveyance unit in which the tension maintaining device is disposed; and a second bundle conveyance unit disposed to be spaced apart from the first bundle conveyance unit in a downward direction.

The bundle reception unit further includes a leg belt disposed parallel with the first bundle conveyance unit to be linked with the first bundle conveyance unit.

The leg belt includes: a belt portion; and a leg portion protruding from an outer surface of the belt portion and provided as a plurality of leg portions disposed to be spaced apart from each other in the longitudinal direction of the belt portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a block diagram of a media transport device including a tension roller for maintaining the tension of a conventional belt;

FIG. 2 is a perspective view of a media transport apparatus including a device for maintaining the tension of a media transport belt according to an embodiment of the present invention;

FIG. 3 is a front view of the media transport apparatus in FIG. 2;

FIG. 4 is a perspective view of a device for maintaining the tension of a media transport belt according to an embodiment of the present invention;

FIGS. 5A and 5B are diagrams of a seesaw operation in which a device for maintaining the tension of a media transport belt rotates in response to the number of pieces of media according to an embodiment of the present invention;

FIG. 6 is a diagram of a state of an operation in which a device for maintaining the tension of a media transport belt according to an embodiment of the present invention uniformly maintains the tension of a first transport belt in response to a difference in the number of pieces of media passing between a first transport belt and a second transport belt;

FIG. 7 is a diagram of an automatic teller machine according to an embodiment of the present invention;

FIG. 8 is a diagram of a bundle reception unit of an automatic teller machine according to an embodiment of the present invention;

FIG. 9 is a diagram of an apparatus for maintaining the tension of an automatic teller machine according to an embodiment of the present invention;

FIG. 10 is a diagram of a state in which an apparatus for maintaining the tension of an automatic teller machine according to an embodiment of the present invention is rotated with respect to a link rotation axis;

FIG. 11 is a diagram of an apparatus for maintaining the tension of an automatic teller machine according to an embodiment of the present invention that provides tension to a transport belt;

FIG. 12 is an enlarged view of the apparatus for maintaining the tension of FIG. 11;

FIG. 13 is a diagram of an apparatus for maintaining the tension of an automatic teller machine according to a modified example of the present invention; and FIG. 14 is a diagram of an automatic teller machine according to another embodiment of the present invention.

DETAILED DESCRIPTION OF EXEMPLARY EMBODIMENTS

Hereinafter, the structure and operation of exemplary embodiments of the present invention will be described in detail with reference to the attached drawings.

Referring to FIGS. 2 and 3, a media transport device 1 to which the present invention is applied is a device capable of depositing and rejecting bundled media input in the form of a bundle, including at least one of cash or a check. The media transport device 1 includes a media transport unit 1000 provided at the upper and lower portions thereof along a media transport path with bundled media therebetween.

The media transport unit 1000 includes a first media transport unit 1100 provided above the bundled media to be in contact with the top surface of the input bundled media, and a second media transport unit 1200 provided below the bundled media to be in contact with the bottom surface of the input bundled media.

The first media transport unit 1100 includes a pair of pulleys 1110 and 1120 provided at positions spaced apart from each other on both sides thereof, a first transport belt 1130 that grips the top surface of the bundled media while running on the pair of first pulleys 1110 and 1120, and a pair of tension maintaining devices 1300 (1300-1 and 1300-2) for automatically adjusting the tension acting on the first transport belt 1130 in a downward direction toward the bundled media.

The first media transport unit 1100 may be driven rotatably in both directions, and may be driven in a deposit direction in which the first media transport unit 1100 rotates clockwise and a reject direction in which the first media transport unit 1100 rotates counterclockwise, based on FIG. 2.

The second media transport unit 1200 includes a pair of second pulleys 1210 and 1220 provided at positions spaced apart from each other on both sides thereof, a second transport belt 1230 that grips the bottom surface of the bundled media while running on the pair of second pulleys 1210 and 1220, and a tension roller 1240 that applies tension to the second transport belt 1230 in an upward direction toward the bundled media. In addition, the second media transport unit 1200 may further include pressing members 1250 and 1260 (see FIG. 6) that apply elastic force in an upward direction on both lower sides of the second media transport unit 1200.

The second media transport unit 1200 may be rotatably driven in both directions, and may be driven in a deposit direction in which the second media transport unit 1200 rotates counterclockwise and a reject direction in which the second media transport unit 1200 rotates clockwise, based on FIG. 2.

The bundled media may be stacked in a media stacked space S provided between the first transport belt 1130 and the second transport belt 1230, and then transported in the deposit direction or the reject direction by the driven first transport belt 1130 and second transport belt 1230.

The second media transport unit 1200 may be vertically moved to correspond to the thickness of the bundled media depending on the number of pieces of the input bundled media. Since the top and bottom surfaces of the bundled media are required to be gripped by the first and second transport belts 1130 and 1230, respectively, to ensure stable media transport, the height of the media stacked space S may be adjusted to correspond to the thickness of the bundled media according to the vertical movement of the second media transport unit 1200.

In an embodiment, the media transport device 1 may include a transport path through which the bundled media input from a media deposit machine are transported in the deposit direction, or media discriminated to be rejected as invalid during a deposit process are transported and stacked, and then discharged. The tension maintaining device 1300 may be provided on the transport path where the rejected media are stacked in the media deposit machine. However, the tension maintaining device 1300 may be widely applied to the transport paths of various types of automatic teller machines in which a plurality of pieces of stacked media are transported using the gripping force of the belt in addition to the media deposit machine.

The tension maintaining device 1300 of the media transport belt of the present invention is a device that uniformly maintains the tension of the belt to secure the gripping force of the belt for gripping and transporting the bundled media in which a plurality of pieces of media are stacked.

Referring to FIG. 4, the tension maintaining device 1300 includes a rotating shaft 1310, and a link member 1320 that has a predetermined length in a direction parallel to the longitudinal direction of the belt, is coupled to the rotating shaft 1310, and is rotatably provided with respect to the rotating shaft 1310 in response to a change in the number of pieces of the bundled media in contact with the belt.

A first roller shaft 1330 is coupled to one end of the link member 1320, and a first roller 1340 is rotatably coupled to the first roller shaft 1330.

A second roller shaft 1350 is coupled to the other end of the link member 1320, and a second roller 1360 is rotatably coupled to the second roller shaft 1350.

In an embodiment, the rotating shaft 1310 is provided at a fixed position, and the first roller 1340 and the second roller 1360 may be provided remain in contact with the first transport belt 1130 by applying predetermined tension to the other side surface opposite one side surface of the first transport belt 1130 through which the bundled media are gripped. Even when the number of pieces of media stacked under the first roller 1340 and the number of pieces of media stacked under the second roller 1360 are the same, the first roller 1340 and the second roller 1360 may be provided in contact with the first transport belt 1130 while applying predetermined uniform tension to the first transport belt 1130.

Referring to FIGS. 5A and 5B, when the number of pieces of media stacked on a side where the first roller 1340 is located differs from the number of pieces of media stacked on a side where the second roller 1360 is located, the link member 1320 may be rotated while being tilted to one side by a seesaw action while the first roller 1340 and the second roller 1360 move in a direction of forces F1 and F2 applied by the deformation of the first transport belt 1130 due to the thickness of the stacked media.

Meanwhile, in response to an increase or decrease in the number of pieces of media stacked in the media stacked space S, the second transport belt 1230 is vertically moved to maintain predetermined tension applied to the bundled media positioned and transported between the first transport belt 1130 and the second transport belt 1230.

That is, the second transport belt 1230 may move downward when the number of pieces of media stacked in the media stacked space S increases, and move upward when the number of pieces of media stacked in the media stacked space S decreases.

Referring to FIG. 6, in a process in which the media are transported to and stacked in the media stacked space S, the number of pieces of media stacked under the first roller 1340 and the number of pieces of media stacked under the second roller may be different.

When the media are sequentially transported to and stacked in the media stacked space S between the first transport belt 1130 and the second transport belt 1230, the sequentially transported media M2 and M3 are stacked on the plurality of pieces of media M that have been first stacked, and the second media transport unit 1200 moves downward in proportion to an increase in the number of pieces of stacked media.

At this time, a load acting on one sides 1130a and 1230a of the first and second transport belts where the number of pieces of stacked media is relatively large may be relatively increased, and a load acting on the other sides 1130b and 1230b of the first and second transport belts where the number of pieces of stacked media is relatively small may be relatively reduced, so that the tension maintaining device 1300 may automatically uniformly adjust such load imbalance.

That is, the first roller 1340, which is one of the first roller 1340 and the second roller 1360, positioned at the side where the number of pieces of stacked media is relatively large, for example, at the one sides 1130a and 1230a of the first and second transport belts in FIG. 6, may be moved in a direction in which the first transport belt 1130 rises, thereby preventing tension overload.

On the other hand, the second roller 1360, which is one of the first roller 1340 and the second roller 1360, positioned at the side where the number of pieces of stacked media is relatively small, for example, at the other sides 1130b and 1230b of the first and second transport belts in FIG. 6, may be moved in a direction in which the first transport belt descends, thereby compensating for tension lost due to the downward movement of the second transport belt 1230.

According to the configuration of the tension maintaining device 1300, the tension can be automatically appropriately adjusted so that the load acting on the belt can be balanced through a seesaw action in response to an increase or decrease in the number of pieces of stacked media. As a result, it is possible to maintain a gripping force of the transport contact point according to the shape of the media, and reduce a change in the amount of contact points for each size of the media. In addition, even when the first and second transport belts 1130 and 1230 are deformed unevenly in each position due to differences in the thickness of the stacked media, the bundled media can be stacked and transported smoothly by maintaining the balance of the belt gripping force acting on the stacked media.

Hereinafter, a specific configuration of an automatic teller machine 1-1 according to an embodiment of the present invention will be described.

Referring to FIGS. 7 and 8, the automatic teller machine 1-1 according to the embodiment of the present invention may discriminate and classify, after media 2 (see FIG. 11) are deposited, the deposited media 2, and then store the media or return the media to a customer. After the media 2 are deposited in the form of bundles, the automatic teller machine 1-1 may separate the deposited bundled media 2 into individual pieces to discriminate the media, classify the discriminated media, and then store the media or return the media to the customer. The media 2 may be bills or checks, and the bundled media 2 may include one or more of the bills and the checks. This automatic teller machine 1 may include a machine main body 100, an upper module 200, and a lower module 300.

The machine main body 100 may accommodate at least a portion of the upper module 200 therein and may detachably accommodate the lower module 300 therein. The machine main body 100 may include an upper body 110 and a lower body 120. The upper body 110 may accommodate at least a portion of the upper module 200 therein. A space in which the upper module 200 can be accommodated may be formed inside the upper body 110. The upper body 110 may be supported by the lower body 120. The lower body 120 may support the upper body 110 and may detachably accommodate the lower module 300 therein. A space in which the lower module 300 can be accommodated may be formed inside the lower body 120.

After media are deposited, the upper module 200 may discriminate and classify the deposited media. After the media are deposited in the form of bundles, the upper module 200 may separate the deposited bundled media into individual pieces to discriminate the media, classify the media based on the discrimination results and temporarily hold the media. In addition, the upper module 200 may return some of the temporarily held media to the customer or transport the media to the lower module 300 and store the transported media in the lower module 300. At least a portion of the upper module 200 may be accommodated inside the upper body 110. The upper module 200 may include a bundle reception unit 210, a media alignment unit 220, a discrimination unit 230, temporary holding units 240 and 250, a check printing unit 260, and an upper transport path 270.

The bundled media may be input into the bundle reception unit 210. In addition, the bundle reception unit 210 may separate the media into individual pieces from the input bundled media and transport the media. The bundled media may include only bills, only checks, or both bills and checks. The bundle reception unit 210 may include a first bundle conveyance unit 211, a second bundle conveyance unit 212, a lifting unit 213, a semi-separation unit 215, a piece separation unit 216, a tension maintaining device 217, and a leg belt 218 (see FIG. 14).

When the bundled media are input into the bundle reception unit 210, the first bundle conveyance unit 211 may convey the media to the semi-separation unit 215 together with the second bundle conveyance unit 212. In addition, when the media are transported from the temporary holding units 240 and 250 to the bundle reception unit 210, the first bundle conveyance unit 211 may convey the media from the semi-separation unit 215 to the second bundle conveyance unit 212. The first bundle conveyance unit 211 may include a first bundle conveying frame 211-1, a first bundle conveying roller 211-2, and a first bundle conveying belt 211-3.

The first bundle conveying frame 211-1 and the second bundle conveying frame 212-1 included in the second bundle conveyance unit 212 may form a space into which the bundled media can be input and a stacked space SR in which the media can be stacked. The first bundle conveying frame 211-1 may be arranged horizontally and rotatably support the first bundle conveying roller 211-2. The first bundle conveying roller 211-2 may be spaced apart from at least both ends of the first bundle conveying frame 211-1 to be rotatable in the forward or reverse direction. The first bundle transport belt 211-3 may be connected to the first bundle conveying roller 211-2 in an endless track form. With this configuration, as the first bundle conveying roller 211-2 rotates in one direction, the first bundle conveying belt 211-3 may perform an endless track motion, and the lower side of the first bundle conveying belt 211-3 performing the endless track motion may be moved in a direction in which the media are deposited or a direction opposite the direction in which the media are deposited.

When the bundled media are input into the bundle reception unit 210, the second bundle conveyance unit 212 may convey the media to the semi-separation unit 215 together with the first bundle conveyance unit 211. In addition, when the media are transported from the temporary holding units 240 and 250 to the bundle reception unit 210, the second bundle conveyance unit 212 may convey and stack the media. The second bundle conveyance unit 212 may be arranged below and spaced apart from the first bundle conveyance unit 211, and may form a space into which the bundled media is input and a space SP in which the media are stacked together with the first bundle conveying frame 211-1 of the first bundle conveyance unit 211. The second bundle conveyance unit 212 may include a second bundle conveying frame 212-1, a second bundle conveying roller 212-2, and a second bundle conveying belt 212-3.

The second bundle conveying frame 212-1 may be horizontally arranged below and spaced apart from the first bundle conveying frame 211-1, and rotatably support the second bundle conveying roller 212-2. The second bundle conveying roller 212-2 may be arranged to be spaced apart from at least both ends of the second bundle conveying frame 212-1 to be rotatable in the forward or reverse direction. The second bundle transport belt 212-3 may be connected to the second bundle conveying roller 212-2 in an endless track form. With this configuration, as the first bundle conveying roller 211-2 rotates in one direction, the second bundle conveying belt 212-3 may perform an endless track motion, and the upper side of the first bundle conveying belt 211-3 performing the endless track motion may be moved in the direction in which the media are deposited or the direction opposite the direction in which the media are deposited.

The lifting unit 213 may lift the second bundle conveyance unit 212. A distance between the first bundle conveyance unit 211 and the second bundle conveyance unit 212 may be adjusted by raising the second bundle conveyance unit 212 using the lifting unit 213. The lifting unit 213 may include a lifting base 213-1, a lifting drive unit 213-2, and an elastic member 213-3.

The lifting base 213-1 may be arranged below and spaced apart from the second bundle conveying frame 212-1 of the second bundle conveyance unit 212. The lifting drive unit 213-2 may be supported by the lifting base 213-1 and lift the second bundle conveying frame 212-1. The lifting drive unit 213-2 may be implemented as a link combined with the second bundle conveying frame 212-1 and the lifting base 213-1 to have a four-bar linkage structure. However, when the lifting drive unit 213-2 has an expandable/contractable structure to lift the second bundle conveying frame 212-2, the lifting drive unit 213-2 may be an operating cylinder that can be expanded and contracted by a working fluid such as air or oil.

The elastic member 213-3 may be disposed between the second bundle conveying frame 212-2 and the lifting base 213-1 to provide an upward elastic force to the second bundle conveying frame 212-2. Even when an upper layer of the bundled media input between the first bundle conveyance unit 211 and the second bundle conveyance unit 212 is moved toward the semi-separation unit 215 so that the height of the bundled media decreases, the elastic member 213-3 may push the second bundle conveyance unit 212 upward so that the upper layer of the bundled media continues to be in contact the first bundle conveying belt 211-3 of the first bundle conveyance unit 211.

When the bundled media are deposited, the semi-separation unit 215 may ensure that only a predetermined number of pieces of media among the bundled media may be conveyed to the piece separation unit 216. The semi-separation unit 215 may be arranged after the second bundle conveyance unit 212 in the direction in which the media is deposited. The semi-separation unit 215 may include a semi-separation roller 215-1 and a bill press 215-2.

A gap between the semi-separation roller 215-1 and the lower surface of the piece separation unit 216 may be formed to allow only the predetermined number of pieces of media to pass through the gap. The bill press 215-2 with the semi-separation roller 215-1 arranged on one side of the upper end thereof may be lifted by a bill press driving unit (not shown) and may be inclined.

The piece separation unit 216 may separate the predetermined number of pieces of media that have passed through the gap between the semi-separation rollers 215-1 into individual pieces. The piece separation unit 216 may be arranged after the semi-separation unit 215 in the direction in which the media are deposited. The piece separation unit 216 may include piece separation rollers 216-1, a piece separation belt 216-2, and a tension roller 216-3.

The pair of piece separation rollers 216-1 may be arranged to be rotatable and spaced apart from each other in the horizontal direction. The piece separation belt 216-2 may be connected to the piece separation rollers 216-1 in an endless track form and moved in a rotation direction of the piece separation rollers 216-1. The tension roller 216-3 may be disposed between the piece separation rollers 216-1 and apply predetermined tension to the lower side of the piece separation belt 216-2 that performs an endless track motion. With this configuration, a portion of the lower side of the piece separation belt 216-2 that performs the endless track motion may have a curved shape rather than a straight shape. The tension roller 216-3 may press the lower side of the piece separation belt 216-2 performing the endless track motion with a predetermined force so that only one medium can pass between the tension roller 216-3 and the piece separation belt 216-1.

Referring to FIGS. 9 to 12, the tension maintaining device 217 may provide uniform tension to the media on the transport belt (e.g., the first bundle conveyance belt 211-3). The tension maintaining device 217 may be arranged to support the transport belt of the bundle reception unit 210 into which the bundled media are input. This tension maintaining device 217 may include a link member 217-1, a link rotation shaft 217-2, a first link roller 217-3, and a second link roller 217-4.

The link member 217-1 may be arranged in the bundle reception unit 210 to support the transport belt. As an example, the link member 217-1 may be arranged in the bundle reception unit 210 to be located at the longitudinal center of the transport belt. The link rotation shaft 217-2 may be eccentrically connected to the link member 217-1. The link member 217-1 may be rotated eccentrically in a seesaw shape around the link rotation shaft 217-2.

The link rotation shaft 217-2 may be rotatably connected to the bundle reception unit 210 and may be positioned at an eccentric point with respect to the longitudinal direction of the link member 217-1. In other words, the link rotation shaft 217-2 may be positioned between the center of gravity of the link member 217-1 and the end of the link member 217-1.

The first link roller 217-3 may be arranged at one end of the link member 217-1 to support one back surface of the transport belt. The first link roller 217-3 may be rotatably connected to one end of the link member 217-1 through the first roller shaft 217-5, whereby the first link roller 217-3 can be rotated in conjunction with the rotation of the transport belt. The first link roller 217-3 may be raised in opposite directions to the second link roller 217-4 about the link rotation shaft 217-2.

The second link roller 217-4 may be arranged at the other end of the link member 217-1 to support the other back surface of the transport belt. The second link roller 217-4 may be rotatably connected to the other end of the link member 217-1 through the second roller shaft 217-6, whereby the second link roller 217-4 can be rotated in conjunction with the rotation of the transport belt. The second link roller 217-4 may be moved up and down in opposite directions to the first link roller 217-3 about the link rotation shaft 217-2.

When the media are transported by the transport belt, the first link roller 217-3 and the second link roller 217-4 may be moved up and down in different vertical directions to provide uniform tension to the transport belt. For example, when the first link roller 217-3 rotates upward about the link rotation shaft 217-2, the second link roller 217-4 may rotate downward about the link rotation shaft 217-2, and when the first link roller 217-3 rotates downward about the link rotation shaft 217-2, the second link roller 217-4 may rotate upward about the link rotation shaft 217-2.

A first separation distance L1 between the first link roller 217-3 and the link rotation shaft 217-2 may be larger than a second separation distance L2 between the second link roller 217-4 and the link rotation shaft 217-2. Accordingly, when the first link roller 217-3 rotates upward or downward and the second link roller 217-4 rotates downward or upward, the movement distance of the first link roller 217-3 may be larger than the movement distance of the second link roller 217-4. In this manner, when the link rotation shaft 217-2 is located eccentrically in the first link roller 217-3 and the second link roller 217-4, the first link roller 217-3 may have a longer movement distance than the second link roller 217-4 compared to a case where the link rotation shaft 217-2 is positioned at the center of the first link roller 217-3 and the second link roller 217-4, thereby securing a stronger gripping force for the media.

In particular, when a difference value between a stack amount of the media positioned at the side of the first link roller 217-3 and a stack amount of the media positioned at the side of the second link roller 217-4 is large, the tension maintaining device 217, in which the link rotation shaft 217-2 is eccentrically positioned, may maintain the tension of the transport belt more uniformly and effectively in response to changes in the stack amount of the media.

Referring to FIG. 13, in the tension maintaining device 217 according to a modified example of the present invention, the link rotation shaft 217-2 may be moved between the center of gravity of the link member 217-1 and the end of the link member 217-1. To this end, the link member 217-1 may include a first link portion 217-11, a second link portion 217-12, and a link connection portion 217-13.

The first link portion 217-11 may have a rod shape arranged on the first link roller 217-3. The first link roller 217-3 may be rotatably arranged at one end of the first link portion 217-11, and the second link portion 217-12 may be connected to the other end of the first link portion 217-11 through the link connection portion 217-13.

The second link portion 217-12 may have a rod shape in which the first link roller 217-3 and the link rotation shaft 217-2 are arranged. One end of the second link portion 217-12 may be connected to the first link portion 217-11 through the link connection portion 217-13, and the second link roller 217-4 may be rotatably arranged at the other end of the second link portion 217-12. In addition, the link rotation shaft 217-2 may be eccentrically arranged at one end of the second link portion 217-12.

The link connection portion 217-13 may connect the first link portion 217-11 and the second link portion 217-12. The link connection portion 217-13 may be connected to at least one of the first link portion 217-11 and the second link portion 217-12 in a retracted or pulled manner. As a portion of the link connection portion 217-13 exposed from at least one of the first link portion 217-11 and the second link portion 217-12 increases, the link rotation shaft 217-2 may be moved a longer distance between the center of gravity of the link member 217-1 and the end of the link member 217-1. In addition, as the portion of the link connection portion 217-13 exposed from at least one of the first link portion 217-11 and the second link portion 217-12 decreases, the link rotation shaft 217-2 may be moved a shorter distance between the center of gravity of the link member 217-1 and the end of the link member 217-1. In other words, when the length of the link connection portion 217-13 exposed between the first link portion 217-11 and the second link portion 217-12 becomes longer or shorter, the link rotation shaft 217-2 may have the same effect as when the link rotation shaft 217-2 is moved relatively between the center of gravity of the link member 217-1 and the end of the link member 217-1.

The link rotation shaft 217-2 may be relatively moved between the center of gravity of the link member 217-1 and the end of the link member 217-1 in consideration of the stack amount of the media positioned at the side of the first link roller 217-3 and the stack amount of the media positioned at the side of the second link roller 217-4. For example, when a difference value between the stack amount of the media positioned at the side of the first link roller 217-3 and the stack amount of the media positioned at the side of the second link roller 217-4 becomes greater than a predetermined reference value, the link rotation shaft 217-2 may be positioned at a point closer to the end of the link member 217-1.

Referring again to FIGS. 7 and 8, the media alignment unit 220 may align and transport the media transported individually from the bundle reception unit 210. The media alignment unit 220 may align and transport media that are transported individually from the bundle reception unit 210 in an unaligned state. For example, the media alignment unit 220 may align and transport the media that are arranged to be inclined relative to the transport direction and transported so that the media may be arranged parallel to the transport direction.

The discrimination unit 230 may discriminate the media that are aligned and transported individually from the media alignment unit 220. The discrimination unit 230 may discriminate whether the medium is a normal medium or a rejected medium. In addition, the discrimination unit 230 may discriminate the type of medium. In other words, the discrimination unit 230 may discriminate whether the medium is a bill or a check. In addition, the discrimination unit 230 may discriminate the denomination of the bill when the medium is a bill. In addition, when the medium is a check, the discrimination unit 230 may discriminate the type of the check. The discrimination unit 230 may include a bill discriminator 231 for discriminating bills and a check discriminator 232 for discriminating checks. For example, the bill discriminator 231 may be a contact image sensor (CIS), and the check discriminator 232 may be a magnetic resistance (MR) sensor.

The temporary holding units 240 and 250 may temporarily hold the media discriminated by the discrimination unit 230. The temporary holding units 240 and 250 may include a normal media temporary holding unit 240 and a rejected media temporary holding unit 250. The normal media temporary holding unit 240 may temporarily hold the normal media, which are discriminated by the discrimination unit 230 and transported individually, in an individual manner. In the normal media temporary holding unit 240, the normal bills or checks may be temporarily held individually. The rejected media temporary holding unit 250 may temporarily hold the rejected media, which are discriminated by the discrimination unit 230 and transported individually, in an individual manner. In the rejected media temporary holding unit 250, the rejected media may be temporarily held individually.

The check printing unit 260 may imprint on checks among the normal media which are transported individually from the normal media temporary holding unit 240. Bills or checks which are normal media temporarily held in the normal media temporary holding unit 240 in an individual manner may be individually transported from the normal media temporary holding unit 240 to the lower module 300, and be stored in cassettes 330 and 340 included in the lower module 300, which will be described later.

The upper transport path 270 may allow the media to be transported individually between the discrimination unit 230 and the normal media temporary holding unit 240 or between the discrimination unit 230 and the rejected media temporary holding unit 250. In addition, the upper transport path 270 may allow the media to be transported individually from the normal media temporary holding unit 240 to the lower module 300 or from the rejected media temporary holding unit 250 to the lower module 300. The upper transport path 270 may include a first upper transport path 271, a second upper transport path 272, a third upper transport path 273, a fourth upper transport path 274, a first upper switching gate 275, and a second upper switching gate 276.

The first upper transport path 271 may allow the media to be transported individually between the discrimination unit 230 and the normal media temporary holding unit 240. In addition, the first upper transport path 271 may allow the media to be transported individually between the discrimination unit 230 and the rejected media temporary holding unit 250. In addition, the first upper transport path 271 may allow the media to be transported individually from the normal media temporary holding unit 240 to the lower module 300. Additionally, the first upper transport path 271 may allow the media to be transported individually from the rejected media temporary holding unit 250 to the lower module 300. The first upper transport path 271 may be connected to the discrimination unit 230 and the normal media temporary holding unit 240. Additionally, the first upper transport path 271 may be connected to the second upper transport path 272 through the first upper switching gate 275. In addition, the first upper transport path 271 may be connected to the third upper transport path 273 through the second upper switching gate 276. The second upper transport path 272 may allow the media to be transported individually between the first upper transport path 271 and the rejected media temporary holding unit 250. The second upper transport path 272 may be connected to the first upper transport path 271 and the rejected media temporary holding unit 250. The second upper transport path 272 may be connected to the first upper transport path 271 through the first upper switching gate 275. The third upper transport path 273 may allow the media to be transmitted individually from the first upper transport path 271 to the check printing unit 260. The third upper transport path 273 may be connected to the first upper transport path 271 through the second upper switching gate 276. The fourth upper transport path 274 may allow the media to be transported individually from the check printing unit 260 to the lower module 300. The fourth upper transport path 274 may be connected to the check printing unit 260 and the lower module 300. The fourth upper transport path 274 may be connected to the lower transport path 321 included in the lower module 300, which will be described later. The first upper switching gate 275 may connect the first upper transport path 271 to the normal media temporary holding unit 240 or connect the first upper transport path 271 to the second upper transport path 272.

The second upper switching gate 276 may or may not connect the first upper transport path 271 to the check printing unit 260.

At least some of the media classified in the upper module 200 may be transported to and stored in the lower module 300. In the lower module 300, the normal media temporarily held in the normal media temporary holding unit 240 of the upper module 200 may be transported individually from the normal media temporary holding unit 240 and stored. The lower module 300 may be detachably accommodated inside the lower body 120 of the machine main body 100. The lower module 300 may be accommodated inside the lower body 120 of the machine main body 100 and connected to the upper module 200 that is at least partially accommodated inside the upper body 110 of the machine main body 100. The lower module 300 may include a cassette reception frame 310, a lower transport module 320, and cassettes 330 and 340.

The cassette reception frame 310 may accommodate the cassettes 330 and 340 in a detachable manner. The cassette reception frame 310 may be detachably accommodated inside the lower body 120 of the machine main body 100 with the cassettes 330 and 340 accommodated therein. The cassette reception frame 310 may be accommodated inside the lower body 120 of the machine main body 100 through one open surface of the lower body 120. One surface of the cassette reception frame 310 may be open, and the cassettes 330 and 340 may be detachably accommodated inside the cassette reception frame 310 through the open one side of the cassette reception frame 310. The open surface of the cassette reception frame 310 may be opened and closed by the lower transport module 320. In a state where the open surface of the cassette reception frame 310 is opened by the lower transport module 320, the cassettes 330 and 340 may be detachably accommodated inside the cassette reception frame 310.

The lower transport module 320 may open and close the open side of the cassette reception frame 310. The lower transport module 320 may include at least a portion of the lower transport path 321 connected to the upper transport path 270 of the upper module 200, and an additional storage box 322. The lower transport path 321 may allow the media transported individually from the upper module 200 to be transported individually to the cassettes 330 and 340 or the additional storage box 322. The lower transport path 321 may include a first lower transport path 321-1, a second lower transport path 321-2, a third lower transport path 321-3, a fourth lower transport path 321-4, a first lower switching gate 321-5, and a second lower switching gate 321-6. The first lower transport path 321-1 may be connected to the upper transport path 270 of the upper module 200. The first lower transport path 321-1 may be connected to the fourth upper transport path 274 of the upper transport path 270. Accordingly, the media may be transported individually from the upper module 200 to the lower module 300 through the fourth upper transport path 274 and the first lower transport path 321-1. The second lower transport path 321-2 may allow the media that are transported individually from the upper module 200 through the first lower transport path 321-1 to be transported to the first cassette 330 which will be described later. The second lower transport path 321-2 may be connected to the first lower transport path 321-1 and the first cassette 330. The second lower transport path 321-2 may be connected to the first lower transport path 321-1 through the first lower switching gate 321-5. The third lower transport path 321-3 may allow the media transported individually through the first lower transport path 321-1 to be transported to the second cassette 340, which will be described later, included in the cassettes 330 and 340. In addition, the third lower transport path 321-3 may allow the media transported individually through the first lower transport path 321-1 to be transported to the additional storage box 322. The third lower transport path 321-3 may be connected to the first lower transport path 321-1 and the second cassette 340. The third lower transport path 321-3 may be connected to the first lower transport path 321-1 through the first lower switching gate 321-5. The fourth lower transport path 321-4 may allow the media transported individually through the first lower transport path 321-1 and the third lower transport path 321-3 to be transported to the additional storage box 322. The fourth lower transport path 321-4 may be connected to the third lower transport path 321-3 through the second lower switching gate 321-6. The first lower switching gate 321-5 may connect the first lower transport path 321-1 to the second lower transport path 321-2 or the third lower transport path 321-3. The second lower switching gate 321-6 may connect the third lower transport path 321-3 to the second cassette 340 or the fourth lower transport path 321-4. The above-described second lower transport path 321-2, third lower transport path 321-3, fourth lower transport path 321-4, first lower switching gate 321-5, and second lower switching gate 321-5 may be included in the lower transport module 320. In addition, the first lower transport path 321-1 may be arranged in the lower body 120 of the machine main body 100 so that the first lower transport path 321-1 can be connected to the fourth upper transport path 274 and second lower transport path 321-2 of the upper transport path 270. The additional storage box 322 may store counterfeit media among the rejected media classified in the upper module 200. In addition, the additional storage box 322 may store unretrieved media that are not retrieved by the customer even though the media have been transported to and stacked in the bundle reception unit 210 to be returned to the customer.

At least some of the media classified in the upper module 200 may be stored in the cassettes 330 and 340. The normal media classified in the upper module 200 may be stored in the cassettes 330 and 340. The cassettes 330 and 340 may store one or more of normal bills and checks. The cassettes 330 and 340 may include a plurality of storage spaces 331, 332, 341 and 342. Accordingly, the normal bills may be stored in one of the plurality of storage spaces 331, 332, 341, and 342 of the cassettes 330 and 340, or the normal checks may be stored in another storage space. Alternatively, the normal bills may be stored in each of the plurality of storage spaces 331, 332, 341, and 342 of the cassettes 330 and 340 for each denomination, or the normal checks may be stored in each of the plurality of storage spaces 331, 332, 341, and 342 of the cassettes 330 and 340 for each type. A plurality of storage spaces 330-1, 330-2, 340-1, and 340-2 may be arranged in a vertical direction and configured to be partitioned from each other.

The cassettes 330 and 340 may be detachably received inside the cassette reception frame 310 through the open surface of the cassette reception frame 310. One side of the cassettes 330 and 340 may be open, and a cassette opening/closing door (not shown) may open and close the open side of the cassettes 330 and 340. In a state in which the cassette opening/closing door opens the one side of the cassettes 330 and 340, the normal media stored in the cassettes 330 and 340 may be withdrawn by the customer. In addition, in a state in which the cassette opening/closing door closes the one side of the cassettes 330 and 340, the cassettes 330 and 340 may be detachably received inside the cassette reception frame 310 through the open one surface of the cassette reception frame 310. The cassettes 330 and 340 may include the first cassette 330 and the second cassette 340. The second lower transport path 321-2 may be connected to the first cassette 330, so that the media transported individually through the second lower transport path 321-2, that is, the normal media, may be stored in the first cassette 330. The first cassette 330 may include a first cassette upper storage space 331 and a first cassette lower storage space 332. The third lower transport path 321-3 may be connected to the second cassette 340 so that the media transported individually through the third lower transport path 321-3, that is, the normal media, may be stored in the second cassette 340. The second cassette 340 may include a second cassette upper storage space 341 and a first cassette lower storage space 342.

A control unit 400 may be connected to the bundle reception unit 210, the media alignment unit 220, the discrimination unit 230, the temporary holding units 240 and 250, the check printing unit 260, and the upper transport path 270 of the upper module 200 to control each of them. For example, when a customer deposits bundled media into the bundle reception unit 210 of the upper module 200, the control unit 400 may control the bundle reception unit 210 so that the deposited bundled media may be separated into individual pieces in the bundle reception unit 210 and transported to the media alignment unit 220. In addition, the control unit 400 may control the media alignment unit 220 so that the media are sorted and transported to the discrimination unit 230. In addition, the control unit 400 may control the upper transport path 270 and the normal media temporary holding unit 240 or the rejected media temporary holding unit 250 so that the media discriminated by the discrimination unit 230 may be transported to the normal media temporary holding unit 240 or the rejected media temporary holding unit 250.

In addition, when the customer selects deposit receipt, the control unit 400 may control the normal media temporary holding unit 240, the upper transport path 270, and the lower transport path and cassettes 330 and 340 of the lower module 300 so that the normal media that are temporarily held in the normal media temporary holding unit 240 may be stored. When the customer selects deposit cancellation, the control unit 400 may control the normal media temporary holding unit 240, the rejected media temporary holding unit 250, the discrimination unit 230, the media alignment unit 220, and the upper transport path 270 so that at least some of the media that are temporarily held in the normal media temporary holding unit 240 and the media that are temporarily held in the rejected media temporary holding unit 250 may be transported to and stacked in the bundle reception unit 210. After the deposit receipt, the control unit 400 may control the rejected media temporary holding unit 250, the discrimination unit 230, the media alignment unit 220, and the upper transport path 270 so that at least some of the rejected media that are temporarily held in the rejected media temporary holding unit 250 may be transported to and stacked in the bundle reception unit 210.

Referring to FIG. 14, in another embodiment of the present invention, the leg belt 218 may be disposed parallel with the first bundle conveyance belt 211-3 of the first bundle conveyance unit 211. The leg belt 218 may be linked with the first bundle conveyance belt 211-3. In other words, when the first bundle conveyance belt 211-3 rotates, the leg belt 218 may rotate in conjunction with the first bundle conveyance belt 211-3. The leg belt 218 may include a belt portion 218-1 and a leg portion 218-2.

The belt portion 218-1 may be an endless track belt. The belt portion 218-1 may be linked with the first bundle conveyance belt 211-3 of the first bundle conveyance unit 211. The belt portion 218-1 may be shared with a driving source that rotates the first bundle conveyance belt 211-3. As an example, the belt portion 218-1 may be rotated in conjunction with the first bundle conveyance belt 211-3 on the first bundle conveyance roller 211-2 that rotates the first bundle conveyance belt 211-3.

The leg portion 218-2 may be formed to protrude from the outer surface of the belt portion 218-1. The leg portion 218-2 may have a sheet shape that protrudes from the outer surface of the belt portion 218-1. The leg portion 218-2 may be provided as a plurality of leg portions 218-2 spaced apart from each other in the longitudinal direction of the belt portion 218-1. The plurality of leg portions 218-2 may be spaced an equal interval from each other in the longitudinal direction of the belt portion 218-1. When the leg belt 218 is rotated, the plurality of leg portions 218-2 may align the ends of the media. The plurality of leg portions 218-2 may transport the media in a neatly aligned state on the transport belt.

According to the device for maintaining the tension of the media transport belt according to the present invention, the configuration of the device for adjusting the tension of the transport belt can be simplified, and the bundled media can be smoothly stacked and transported by maintaining the balance of the belt gripping force acting on the stacked media.

In addition, according to the automatic teller machine and the apparatus for maintaining the tension of the automatic teller machine according to the present invention, when the media are transported through the transport belt, the transport belt can be supported eccentrically with respect to the media stacked with different stack amounts, thereby uniformly maintaining the tension of the transport belt in response to changes in the stack amount of the media.

In addition, when the transport belt is conveyed, the leg portion of the leg belt can align the ends of the media, thereby transporting the media in a neatly aligned state on the transport belt.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A device for maintaining tension of a belt to ensure a gripping force of the belt for gripping and transporting bundled media in which a plurality of pieces of media are stacked, the device comprising:
   a rotation shaft;
   a link member coupled to the rotation shaft while having a predetermined length in a direction parallel to the longitudinal direction of the belt, and provided to be rotatable about the rotation shaft in response to a change in the number of pieces of the bundled media in contact with the belt;
   a first roller rotatably coupled to a first roller shaft provided at one end of the link member and maintained in contact with the belt; and
   a second roller rotatably coupled to a second roller shaft provided at the other end of the link member and maintained in contact with the belt.

2. The device of claim 1, wherein the rotation shaft is provided in a fixed position, and the first roller and the second roller are provided to be maintained in contact with the belt while applying predetermined tension to a side surface opposite one side surface of the belt in which the bundled media are gripped.

3. The device of claim 2, wherein, when the number of pieces of media stacked on a side where the first roller is positioned differs from the number of pieces of media stacked on a side where the second roller is positioned, the link member is tilted to one side due to a seesaw action while the first roller and the second roller are moved in a direction of a force acting by deformation of the belt due to a thickness of the stacked media.

4. The device of claim 3, wherein the belt includes a first transport belt provided at an upper portion of the bundled media to be in contact with an upper surface of the bundled media, and a second transport belt provided at a lower portion of the bundled media to be in contact with a lower surface of the bundled media,
the first roller and the second roller are provided to be maintained in contact with the first transport belt, and
the second transport belt is moved vertically in response to an increase or decrease in the number of pieces of the stacked media.

5. The device of claim 4, wherein, when the number of pieces of media stacked under the first roller and the number of pieces of media stacked under the second roller are different, one of the first roller and the second roller positioned on a side on which the number of pieces of the stacked media is relatively larger is moved in a direction in which the first transport belt rises to prevent tension overload, and
the other of the first roller and the second roller positioned on a side on which the number of pieces of the stacked media is relatively smaller is moved in a direction in which the first transport belt is lowered to compensate for tension lost due to downward movement of the second transport belt.

6. The device of claim 4, wherein, even when the number of pieces of media stacked under the first roller and the number of pieces of media stacked under the second roller are the same, the first roller and the second roller are provided in contact with the first transport belt while applying predetermined tension to the first transport belt.

7. The device of claim 1, wherein a tension maintaining device of the media transport belt is provided on a transport belt where rejected media are stacked in a media deposit machine.

8. A tension maintaining device of an automatic teller machine, which is arranged to support a transport belt of a bundle reception unit, into which bundled media are input, and provides uniform tension on the media on the transport belt, the tension maintaining device comprising:
a link member;
a ling rotation shaft rotatably connected to the bundle reception unit at an eccentric position with respect to the longitudinal direction of the link member;
a first link roller disposed on one end of the link member to support one side surface of the transport belt; and
a second link roller disposed on the other end of the link member to support the other side surface of the transport belt,
wherein, when the media are transported by the transport belt, the first link roller and the second link roller are lifted and lowered in different vertical directions to provide uniform tension to the transport belt.

9. The tension maintaining device of claim 8, wherein a first separation distance between the first link roller and the link rotation shaft is greater than a second separation distance between the second link roller and the link rotation shaft.

10. The tension maintaining device of claim 8, wherein the link member is disposed at a center in the longitudinal direction of the transport belt, and the link rotation shaft is disposed between a center of gravity of the link member and an end of the link member.

11. The tension maintaining device of claim 10, wherein the link rotation shaft is movable between the center of gravity of the link member and the end of the link member.

12. The tension maintaining device of claim 11, wherein, when a difference value between a stack amount of the media positioned at a side of the first link roller and a stack amount of the media positioned at a side of the second link roller is greater than a predetermined reference value, the link rotation shaft is positioned at a point closer to the end of the link member.

13. An automatic teller machine comprising:
a bundle reception unit configured to receive bundled media;
a discrimination unit configured to discriminate the media received in the bundle reception unit; and
a control unit configured to control the bundle reception unit and the discrimination unit,
wherein the bundle reception unit includes:
the tension maintaining device of claim 8;
a first bundle conveyance unit in which the tension maintaining device is disposed; and
a second bundle conveyance unit disposed to be spaced apart from the first bundle conveyance unit in a downward direction.

14. The automatic teller machine of claim 13, wherein the bundle reception unit further includes a leg belt disposed parallel with the first bundle conveyance unit to be linked with the first bundle conveyance unit.

15. The automatic teller machine of claim 14, wherein the leg belt includes:
a belt portion; and
a leg portion protruding from an outer surface of the belt portion and provided as a plurality of leg portions disposed to be spaced apart from each other in the longitudinal direction of the belt portion.

\* \* \* \* \*